(12) United States Patent
Kasai

(10) Patent No.: US 7,201,478 B2
(45) Date of Patent: Apr. 10, 2007

(54) INK COMPOSITION AND INKJET RECORDING METHOD

(75) Inventor: Seishi Kasai, Shizuoka (JP)

(73) Assignee: FujiFilm Corporation, Tokyo (JP)

( * ) Notice: Subject to any disclaimer, the term of this patent is extended or adjusted under 35 U.S.C. 154(b) by 286 days.

(21) Appl. No.: 10/925,029

(22) Filed: Aug. 25, 2004

(65) Prior Publication Data
US 2005/0046683 A1    Mar. 3, 2005

(30) Foreign Application Priority Data
Aug. 25, 2003    (JP)    ............ P.2003-300013

(51) Int. Cl.
*G01D 11/00*    (2006.01)
(52) U.S. Cl. .................................. 347/100
(58) Field of Classification Search .......... None
See application file for complete search history.

(56) References Cited

U.S. PATENT DOCUMENTS 5,952,048 A    9/1999    Tsubuko et al.
6,158,844 A    12/2000    Murakami et al.
6,412,937 B1    7/2002    Kato et al.
2002/0195584 A1    12/2002    Nielsen et al.

FOREIGN PATENT DOCUMENTS

| EP | 1 205 815 A1 | 5/2002 |
| JP | 8-291267 A | 11/1996 |
| JP | 408291267 A | * 11/1996 |
| JP | 3315334 B2 | 6/2002 |

OTHER PUBLICATIONS

Patent Abstracts of Japan—2000 327971 (2001), vol. No. 2000, No. 14.
Patent Abstracts of Japan—2001 279139 (2002), vol. No. 2002, No. 02.
Partial European Search Report dated Dec. 6, 2004.

* cited by examiner

*Primary Examiner*—Thinh Nguyen
(74) *Attorney, Agent, or Firm*—Sughrue Mion, PLLC (57) ABSTRACT

The ink composition thus provided comprises: a dispersion medium; and a charged particle comprising a colorant, wherein the charged particle contains at least one polymer, and said at least one polymer includes at least one polymer having a melting point (Tm). A method of inkjet recording thus provided comprises flying an ink droplet of the ink composition by utilizing an electrostatic field.

8 Claims, 3 Drawing Sheets

INK COMPOSITION AND INKJET RECORDING METHOD

BACKGROUND OF THE INVENTION

1. Field of the Invention

The present invention relates to an ink composition and an inkjet recording method, and more particularly, it relates to an ink composition and an inkjet recording method capable of fixing an image with high quality to a recording medium at a low temperature and a high speed.

2. Description of the Related Art

As an image recording process of forming an image on a recording material, such as paper, based on image data signals, the electrophotographic system, the sublimation or melting thermal transfer system and the inkjet system have been conventionally known. Among these, the electrophotographic system requires such a process that an electrostatic latent image is formed on a photoreceptor drum through charging or exposure to necessitate a complex system, and an apparatus therefor is expensive. The thermal transfer system involves a high running cost and problems, such as formation of waste materials, due to the use of an ink ribbon, although an apparatus therefor itself is inexpensive in comparison to the electrophotographic system. In the inkjet system, on the other hand, image formation is carried out with an inexpensive apparatus in such a manner that an ink is ejected directly to only a necessary image part on a recording material, and thereby the ink can be used efficiently to reduce the running cost. Furthermore, the inkjet system causes less noise, and is excellent as an image recording process.

The inkjet recording system includes, for example, a system of flying ink droplets by pressure of vapor generated by heat from a heater, a system of flying ink droplets by mechanical pressure pulses generated by a piezoelectric element, and a system of flying ink droplets containing charged particles by utilizing an electrostatic field (as described in Japanese Patent No. 3,315,334 and U.S. Pat. No. 6,158,844). The system of flying ink droplets with vapor or mechanical pressure cannot control the flying direction of ink droplets, and there are some cases where ink droplets are difficult to be attached accurately to desired positions on a printing media due to distortion of ink nozzles and air convection.

On the other hand, the system utilizing an electrostatic field controls the flying direction of ink droplets with the electrostatic field to enable ink droplets to be attached desired positions, and thus has advantages that an imaged material (printed matter) with high image quality can be produced.

As an ink composition used for the inkjet recording system utilizing an electrostatic field, an ink composition containing charged particles containing at least a colorant is generally employed (as described in JP-A-8-291267 and U.S. Pat. No. 5,952,048). The ink composition containing a colorant can be formed as inks of four colors, i.e., yellow, magenta, cyan and black, by changing the colorant, and can also be formed as special color inks of gold and silver. Accordingly, the ink composition is useful for producing a color imaged material (printed matter) In order to maintain the high image quality and to produce color imaged materials (printed matters) stably, it is necessary to provide means for fixing the ink composition to paper. In the inkjet recording system, furthermore, the fixation is attained without deterioration of image quality at a low temperature with high speed under such conditions that a solvent remains in the image part and the paper, and the fixation satisfying the all the aforementioned requirements has not yet been realized.

SUMMARY OF THE INVENTION

The invention has been made under the aforementioned circumstances, and an object thereof is to provide such ink composition and inkjet recording method that are capable of fixing an image with high quality to a recording medium at a low temperature with high speed.

The invention includes the following constitutions.

(1) An ink composition for electrostatic inkjet recording, comprising:

a dispersion medium; and a charged particle comprising a colorant, wherein the charged particle contains at least one polymer, and said at least one polymer includes at least one first polymer having a melting point (Tm).

(2) The ink composition for electrostatic inkjet recording of as described in (1) above, wherein the melting point of said at least one first polymer is from 40 to 100° C.

(3) The ink composition for electrostatic inkjet recording as described in (1) or (2) above, wherein said at least one polymer includes said at least one first polymer in amount of from 5 to 100% by weight.

(4) The ink composition for electrostatic inkjet recording as described in any of (1) to (3) above, wherein said at least one first polymer comprises a crystalline polyester compound.

(5) The ink composition for electrostatic inkjet recording as described in any of (1) to (3) above, wherein said at least one first polymer comprises a crystalline polyethylene compound.

(6) The ink composition for electrostatic inkjet recording as described in any of (1) to (3) above, wherein said at least one first polymer comprises a crystalline polyethylene glycol compound.

(7) The ink composition for electrostatic inkjet recording as described in any of (1) to (6) above, wherein the charged particle further contains a coating material that coats the colorant, the coating material comprising at least one of (i) said at least one first polymer and (ii) at least one second polymer not having a melting point.

(8) The ink composition for electrostatic inkjet recording as described in (7) above, which has the coating material in amount of from 0.1 to 40% by weight.

(9) An method of inkjet recording comprising: flying an ink droplet of an ink composition by utilizing an electrostatic field, wherein the ink composition comprises:

a dispersion medium; and a charged particle comprising a colorant, wherein the charged particle contains at least one polymer, and said at least one polymer includes at least one first polymer having a melting point.

DETAILED DESCRIPTION OF THE INVENTION

The ink composition according to the invention comprises a dispersion medium and a charged particle comprising a colorant, wherein the charged particle contains at least one polymer, and said at least one polymer includes at least one polymer having a melting point (Tm) (first polymer).

The constitutional components of the ink composition according to the invention will be described below.

[Polymer Having Melting Point (Tm)]

As the polymer having a melting point (Tm) constituting the ink composition according to the invention, a crystalline polymer is preferably used. Examples of the crystalline polymer include polymers, such as polyester, polyalkylene, polyalkylene oxide, polyamide, polyimide, polyurethane, polyurea, polystyrene, an acrylic resin, an epoxy resin, polyamine, polyketone, polyvinyl alcohol and polyvinyl ether, and preferred examples thereof include polyester, polyalkylene, polyalkylene oxide, polyamide, polyimide, polyurethane, polyurea, polystyrene, an acrylic resin and an epoxy resin. Among these, polyester, polyethylene, polyethylene oxide (including a polyethylene glycol compound), polyamide, polyimide, polyurethane and polyurea are particularly preferably used.

The polymer having a melting point (Tm) preferably has a melting point (Tm) of from 40 to 100° C., more preferably from 40 to 95° C., and further preferably from 50 to 90° C. The fixing property of an image is further improved in this range of the melting point (Tm).

The melting point (Tm) referred herein means a peak temperature of an endothermic peak in a DSC measurement. In the invention, DSC TA3000 (produced by METTLER TOLEDO International Inc.) is used as a measuring apparatus, and the measurement of melting point (Tm) is carried out at a temperature increasing rate of 10° C. per minute in a temperature range of from −90 to 150° C.

In the invention, said at least one polymer includes said at least one polymer having a melting point (Tm) in amount of from 5 to 100% by weight, more preferably from 10 to 100% by weight, and further preferably from 10 to 80% by weight.

The polymer having a melting point (Tm) preferably has a weight average molecular weight Mw of from 5,000 to 100,000.

[Dispersion Medium]

The dispersion medium used in the ink composition according to the invention is preferably a dielectric liquid having a high electric resistivity, specifically $10^{10}$ Ω·cm or more. A dispersion medium having a low electric resistivity is not suitable for this embodiment of the invention since such a dispersion medium causes electric conduction between recording electrodes adjacent to each other. The dielectric liquid preferably has a dielectric constant of 5 or less, more preferably 4 or less, and further preferably 3.5 or less. The use of a dielectric liquid having a dielectric constant in the range is preferred since an electric filed is efficiently applied to the charged particles in the dielectric liquid.

Examples of the dispersion medium used in the invention include a linear or branched aliphatic hydrocarbon, an alicyclic hydrocarbon, an aromatic hydrocarbon, halogen-substituted products of these hydrocarbons, and a silicone oil. Specific examples thereof include hexane, heptane, octane, isooctane, decane, isodecane, decalin, nonane, dodecane, isododecane, cyclohexane, cyclooctane, cyclodecane, toluene, xylene, mesitylene, Isopar C, Isopar E, Isopar G, Isopar H, Isopar L and Isopar M ("Isopar" is a trade name of Exxon Chemical Corp.), Shellsol 70 and Shellsol 71 ("Shellsol" is a trade name of Shell Oil Co.), Amsco OMS and Amsco 460 solvents ("Amsco" is a trade name of American Mineral Spirits Corp.), and KF-96L (a trade name of Shin-Etsu Silicone Co., Ltd.), which may be used solely or in combination as a mixture. The content of the dispersion medium in the ink composition is preferably from 20 to 99% by weight. The particles containing a colorant can be dispersed in the dispersion medium in good conditions with the content of the dispersion medium of 20% by weight or more, and the content of a colorant is sufficient with the content of the dispersion medium of 99% by weight or less.

[Colorant]

Known dyes and pigments can be used as the colorant used in the ink composition according to the invention, and can be appropriately selected depending on purposes and targets. For example, a pigment is preferably used from the standpoint of color tone of an imaged material (printed matter) thus recorded (as described, for example, in "Ganryo Bunsan Anteika to Hyomen Shori Gijutu Hyoka" (Pigment Dispersion Stabilization and Surface Treatment Technique and Evaluation), published by Gijutsu Joho Kyokai Co., Ltd. on Dec. 25, 2001 (First Issue), which is hereinafter sometimes referred to as Non-patent Document 1). Inks of four colors, i.e., yellow, magenta, cyan and black, can be produced by changing the colorant. In particular, pigments that are used in an offset printing ink and for proofing are preferably used since color tones equivalent to an offset printed matter can be obtained.

Examples of a pigment for a yellow ink include a monoazo pigment, such as C.I. Pigment Yellow 1 and C.I. Pigment Yellow 74, a disazo pigment, such as C.I. Pigment Yellow 12 and C.I. Pigment Yellow 17, a non-benzidine azo pigment, such as C.I. Pigment Yellow 180, an azo lake pigment, such as C.I. Pigment Yellow 100, a condensed azo pigment, such as C.I. Pigment Yellow 95, an acidic dye lake pigment, such as C.I. Pigment Yellow 15, a basic dye lake pigment, such as C.I. Pigment Yellow 18, an anthraquinone pigment, such as Flavanthrone Yellow, an isoindolinone pigment, such as Isoindolinone Yellow 3RLT, a quinophthalone pigment, such as Quinophthalone Yellow, an isoindoline pigment, such as Isoindoline Yellow, a nitroso pigment, such as C.I. Pigment Yellow 153, a metallic complex azomethine pigment, such as C.I. Pigment Yellow 117, and an isoindolinone pigment, such as C.I. Pigment Yellow 139.

Examples of a pigment for a magenta ink include a monoazo pigment, such as C.I. Pigment Red 3, a disazo pigment, such as C.I. Pigment Red 38, an azo lake pigment, such as C.I. Pigment Red 53:1 and C.I. Pigment Red 57:1, a condensed azo pigment, such as C.I. Pigment Red 144, an acidic dye lake pigment, such as C.I. Pigment Red 174, a basic dye lake pigment, such as C.I. Pigment Red 81, an anthraquinone pigment, such as C.I. Pigment Red 177, a thioindigo pigment, such as C.I. Pigment Red 88, a perynone pigment, such as C.I. Pigment Red 194, a perylene pigment, such as C.I. Pigment Red 149, a quinacridone pigment, such as C.I. Pigment Red 122, an isoindolinone pigment, such as C.I. Pigment Red 180, and an alizarin lake pigment, such as C.I. Pigment Red 83.

Examples of a pigment for a cyan ink include a disazo pigment, such as C.I. Pigment Blue 25, a phthalocyanine pigment, such as C.I. Pigment Blue 15, an acidic dye lake pigment, such as C.I. Pigment Blue 24, a basic dye lake pigment, such as C.I. Pigment Blue 1, an anthraquinone pigment, such as C.I. Pigment Blue 60, and an alkali blue pigment, such as C.I. Pigment Blue 18.

Examples of a pigment for a black ink include an organic pigment, such as an aniline black pigment, an iron oxide pigment, and a carbon black pigment, such as furnace black, lamp black, acetylene black and channel black.

A processed pigment represented by a Microlith pigment, such as Microlith-A, K and T, can also be preferably used. Specific examples thereof include Microlith Yellow 4G-A, Microlith Red BP-K, Microlith Blue 4G-T and Microlith Black C-T.

Various kinds of other pigments may be used depending on necessity, such as calcium carbonate and titanium oxide as a pigment for a white ink, aluminum powder for a silver ink, and a copper alloy for a gold ink.

It is basically preferred that only one kind of a pigment is used for one color from the standpoint of simpleness in production of ink, but in some cases, two or more kinds of inks are preferably used in combination, for example, phthalocyanine is mixed with carbon black for a black ink. The pigments may be used after subjecting to a surface treatment by a known method, such as a rosin treatment (as described in above mentioned Non-patent Document 1).

The content of the colorant (pigment) in the total ink composition is preferably from 0.1 to 50% by weight. The pigment amount is sufficient to provide good coloration on printed matters with the content of 0.1% by weight or more, and the particles containing the colorant can be dispersed in the dispersion medium in good conditions with the content of 50% by weight or less. The content of the colorant is more preferably from 1 to 30% by weight.

[Coating Material]

In the ink composition in the invention, it is preferred that the colorant, such as a pigment, is dispersed in the dispersion medium (formed into particles) in a state coated with a coating material, rather than the case where the colorant is directly dispersed therein (formed into particles). According to the invention, at least one polymer having a melting point (Tm) (first polymer) may be used as the coating material, and at least one polymer having no melting point (Tm) (second polymer) may also be used as the coating material. The charge owned by the colorant can be shielded by coating with the coating material, whereby desired charging characteristics can be imparted. In the invention, after attaining inkjet recording to a recording medium, an image thus recorded is fixed with heating means, such as a heat roller, upon which the coating material is melted by heat to fix the image efficiently.

Examples of the coating material include a rosin compound, a rosin-modified phenol resin, an alkyd resin, a (meth)acrylic polymer, polyurethane, polyester, polyamide, polyethylene, polybutadiene, polystyrene, polyvinyl acetate, an acetal-modified product of polyvinyl alcohol, and polycarbonate. Among these, a polymer having a weight average molecular weight of from 2,000 to 1,000,000 and a polydispersion degree (weight average molecular weight/number average molecular weight) of from 1.0 to 5.0 is preferred from easiness in particle formation. Furthermore, a polymer having one of a softening point and a glass transition point of from 40 to 120° C. is preferred from the standpoint of easiness in fixation.

Preferred examples of the coating material used in the invention include a polymer having a unit represented by the following general formulae (1) to (4).

Formula (1)

Formula (2)

Formula (3)

Formula (4)

In the formulae, $X_{11}$ represents an oxygen atom or $-N(R_{13})-$; $R_{11}$ represents a hydrogen atom or a methyl group; $R_{12}$ represents a hydrocarbon group having from 1 to 30 carbon atoms; $R_{13}$ represents a hydrogen atom or a hydrocarbon group having from 1 to 30 carbon atoms; $R_{21}$ represents a hydrogen atom or a hydrocarbon group having from 1 to 20 carbon atoms; and $R_{31}$, $R_{32}$ and $R_{41}$ each independently represents a bivalent hydrocarbon group having from 1 to 20 carbon atoms. The hydrocarbon groups represented by $R_{12}$, $R_{21}$, $R_{31}$, $R_{32}$ and $R_{41}$ may contain an ether bond, an amino group, a hydroxyl group or a halogen-substituted group.

The polymer having a unit represented by the general formula (1) can be obtained by radical polymerization of a corresponding radical polymerizable monomer by a known method. Examples of the radical polymerizable monomer include a (meth)acrylate ester, such as methyl (meth)acrylate, ethyl (meth)acrylate, propyl (meth)acrylate, butyl (meth)acrylate, hexyl (meth)acrylate, octyl (meth)acrylate, 2-ethylhexyl (meth)acrylate, dodecyl (meth)acrylate, stearyl (meth)acrylate, cyclohexyl (meth)acrylate, phenyl (meth)acrylate, benzyl (meth) acrylate and 2-hydroxyethyl (meth)acrylate, and an acrylamide, such as N-methyl(meth)acrylamide, N-propyl(meth)acrylamide, N-phenyl(meth)acrylamide and N,N-dimethyl(meth)acrylamide.

The polymer having a unit represented by the general formula (2) can be obtained by radical polymerization of a corresponding radical polymerizable monomer by a known method. Examples of the radical polymerizable monomer include ethylene, propylene, butadiene, styrene and 4-methylstyrene.

The polymer having a unit represented by the general formula (3) can be obtained by dehydration condensation of a corresponding dicarboxylic acid or acid anhydride with a diol by a known method. Examples of the dicarboxylic acid include succinic anhydride, adipic acid, sebacic acid, isophthalic acid, terephthalic acid, 1,4-phenylenediacetic acid and diglycolic acid. Examples of the diol include ethylene glycol, 1,2-propanediol, 1,3-propanediol, 1,4-butanediol, 1,6-hexanediol, 1,10-decanediol, 2-butene-1,4-diol, 1,4-cyclohexanediol, 1,4-cyclohexanedimethanol, 1,4-benzenedimethanol and diethylene glycol.

The polymer having a unit represented by the general formula (4) can be obtained by dehydration condensation of a corresponding carboxylic acid having a hydroxyl group by a known method, or by ring-opening polymerization of a corresponding cyclic ester of a carboxylic acid having a hydroxyl group by a known method. Examples of the carboxylic acid having a hydroxyl group and a cyclic ester thereof include 6-hydroxyhexanoic acid, 11-hydroxyundecanoic acid, hydroxybenzoic acid and ε-caprolactone.

The polymer having a unit represented by at least one of general formulae (1) to (4) each may be a homopolymer of the units represented by the general formulae (1) to (4), or may be a copolymer with another constitutional component. The polymers may be used as the coating material solely or in combination of two or more kinds thereof.

Particularly preferred examples of the coating material include polyester, polyacrylate, a styrene-acrylate copolymer, polyethylene and polyurethane, and most preferably, polyester, polyacrylate, a styrene-acrylate copolymer and polyethylene.

The content of the coating material in the total ink composition is preferably from 0.1 to 40% by weight. The amount of the coating material is sufficient to provide sufficient fixing property with the content of 0.1% by weight or more, and particles containing the colorant and the coating material can be produced in good conditions with the content of 40% by weight or less.

[Dispersing Agent]

In the invention, a mixture of the colorant, the polymer having a melting point (Tm) and the coating material, for example, is dispersed in the dispersing medium (formed into particles), upon which it is further preferred to use a dispersing agent for controlling the particle diameter and for preventing the particles from being precipitated.

Preferred examples of the dispersing agent include a surface active agent represented by a sorbitan fatty acid ester, such as sorbitan monooleate, and a polyethylene glycol fatty acid ester, such as polyoxyethylene distearate. Examples thereof further include a copolymer of styrene and maleic acid and an amine-modified product thereof, a copolymer of styrene and (meth)acrylic compound, a (meth)acrylic polymer, a copolymer of ethylene and (meth)acrylic compound, rosin, BYK-160, 162, 164 and 182 (trade names of polyurethane polymers, produced by BYK Chemie GmbH), EFKA 401 and 402 (trade names of acrylic polymers, produced by EFKA Additives B.V.), and Solsperse 17000, 24000 (a trade name of a polyester polymer, by Zeneca PLC). In the invention, such a polymer is preferably used that has a weight average molecular weight of from 1,000 to 1,000,000 and a polydispersion degree (weight average molecular weight/number average molecular weight) of from 1.0 to 7.0, from the standpoint of long term storage stability of the ink composition. A graft polymer and a block polymer are most preferably used.

Most preferred examples of the polymer used as the dispersing agent in the invention include a graft polymer containing at least a polymer component having at least one of units represented by the following general formulae (5) and (6) with a graft chain having a unit represented by the following general formula (7):

In the formulae, $X_{51}$ represents an oxygen atom or $—N(R_{53})—$; $R_{51}$ represents a hydrogen atom or a methyl group; $R_{52}$ represents a hydrocarbon group having from 1 to 10 carbon atoms; $R_{53}$ represents a hydrogen atom or a hydrocarbon group having from 1 to 10 carbon atoms; R61 represents a hydrogen atom, a hydrocarbon group having from 1 to 20 carbon atoms, a halogen atom, a hydroxyl group or an alkoxy group having from 1 to 20 carbon atoms; $X_{71}$ represents an oxygen atom or $—N(R_{73})—$; $R_{71}$ represents a hydrogen atom or a methyl group; $R_{72}$ represents a hydrocarbon group having from 4 to 30 carbon atoms; and $R_{73}$ represents a hydrogen atom or a hydrocarbon group having from 1 to 30 carbon atoms. The hydrocarbon groups represented by $R_{52}$ and $R_{72}$ may contain an ether bond, an amino group, a hydroxyl group or a halogen-substituted group.

The graft polymer can be obtained in such a manner that a radical polymerizable monomer corresponding to the general formula (7) is polymerized, preferably in the presence of a chain transfer agent, and polymerizable functional groups are introduced to ends of the resulting polymer, which is then further copolymerized with a radical polymerizable monomer corresponding to the general formula (5) or (6).

Examples of the radical polymerizable monomer corresponding to the general formula (5) include a (meth)acrylate ester, such as methyl (meth)acrylate, ethyl (meth)acrylate, propyl (meth)acrylate, butyl (meth)acrylate, hexyl (meth) acrylate, cyclohexyl (meth)acrylate, phenyl (meth)acrylate, benzyl (meth) acrylate and 2-hydroxyethyl (meth) acrylate, and a (meth) acrylamide, such as N-methyl (meth) acrylamide, N-propyl(meth)acrylamide, N-phenyl(meth)acrylamide and N,N-dimethyl(meth)acrylamide.

Examples of the radical polymerizable monomer corresponding to the general formula (6) include styrene, 4-methylstyrene, chlorostyrene and methoxystyrene.

Examples of the radical polymerizable monomer corresponding to the general formula (7) include hexyl (meth) acrylate, octyl (meth)acrylate, 2-ethylhexyl (meth)acrylate, dodecyl (meth)acrylate and stearyl (meth) acrylate.

Specific examples of the graft polymer include polymers represented by the following structural formulae.

The graft polymer containing at least a polymer component having at least one of units represented by the general formulae (5) and (6) with a graft chain having at least a unit represented by the general formula (7) may have only the units represented by the general formula(e) (5) and/or (6) and the general formula (7), and may also contain another constitutional component. The compositional ratio of the polymer component containing the graft chain and the other polymer component is preferably from 10:90 to 90:10. The range is preferred since formation of particles can be attained in good conditions, and a desired particle diameter can be easily obtained. The polymer may be used as the dispersing agent solely or in combination as a mixture.

The content of the dispersing agent in the total amount of ink composition is preferably from 0.01 to 30% by weight. Formation of particles can be attained in good conditions, and a desired particle diameter can be obtained within the range.

[Charge Controlling Agent]

It is preferred in the invention that a mixture of the colorant, the polymer having a melting point (Tm) and the coating material is dispersed in the dispersion medium (formed into particles) by using the dispersing agent, and it is further preferred that a charge controlling agent for controlling the charge amount of the particles is used in combination.

Preferred examples of the charge controlling agent include a metallic salt of an organic carboxylic acid, such as zirconium naphthenoate and zirconium octenoate, an ammonium salt of an organic carboxylic acid, such as tetramethyammonium stearate, a metallic salt of an organic sulfonic acid, such as sodium dodecylbenzenesulfonate and magnesium dioctylsulfosuccinate, an ammonium salt of an organic sulfonic acid, such as tetrabutylammonium toluenesulfonate, a polymer having a carboxylic acid group on a side chain, such as a polymer having a carboxylic acid group formed by modifying a copolymer of styrene and maleic anhydride with an amine, a polymer having a carboxylic anionic group on a side chain, such as a copolymer of stearyl methacrylate and tetramethyammonium methacrylate, a polymer having a nitrogen atom on a side chain, such as a copolymer of styrene and vinylpyridine, and a polymer having an ammonium group on a side chain, such as a copolymer of butyl methacrylate and N-(2-methacryloyloxyethyl)-N,N,N-trimethylammonium tosylate. The charge imparted to the particles may be positive charge or negative charge. The content of the charge controlling agent in the total ink composition is preferably from 0.0001 to 10% by weight. The ink composition according to the invention preferably has an electroconductivity of from 10 to 300 nS/m, and the charged particles preferably have an electroconductivity of 50% or more the electroconductivity of the ink composition. These conditions can be easily adjusted by changing the content of the charge controlling agent.

[Other Components]

In the invention, an antiseptic for preventing decay, a surface active agent for controlling the surface tension, and the like may be added depending on purposes.

[Production of Charged Particles]

The ink composition containing the charged particles according to the invention can be produced by using the aforementioned components through dispersion (formation of particles) the colorant, the polymer having a melting point (Tm) and preferably the coating material. Examples of the method for dispersing (forming into particles) include the following methods.

(1) The colorant, the polymer having a melting point (Tm) and preferably the coating material are mixed, and the mixture is dispersed (formed into particles) by using the dispersing agent and the dispersion medium, to which the charge controlling agent is then added.

(2) The colorant, the polymer having a melting point (Tm), the coating material, the dispersing agent and the dispersion medium are simultaneously dispersed (formed into particles), and then the charge controlling agent is added.

(3) The colorant, the polymer having a melting point (Tm), the coating material, the dispersing agent, the charge controlling agent and the dispersion medium are simultaneously dispersed (formed into particles).

As having been described, the polymer having a melting point (Tm) can also function as the coating material.

Examples of an apparatus for using upon mixing and dispersing include a kneader, a dissolver, a mixer, a high-speed disperser, a sand mill, a roll mill, a ball mill, an attritor and a beads mill (as described in above mentioned Non-patent Document 1).

The ink particles (charged particles) in the invention suitably has a diameter of from 0.5 to 4 mm, preferably from 0.7 to 3.5 mm, and more preferably from 0.8 to 3 mm. The size is larger than that of the toner for the ordinary electrophotographic liquid developer (from 0.1 to 0.4 mm) and is smaller than that of the toner for the ordinary electrophotographic dry developer (from 5 to 15 mm).

The ink composition preferably has a viscosity (20° C.) of from 0.5 to 5 mPa·s. Such problems as leakage from an ink ejection outlet of a head and ejection failure of ink droplets can be prevented within the range. The viscosity is more preferably from 0.8 to 4 mpa·s. The ink composition preferably has a surface tension of from 10 to 70 mN/m. Such problems as leakage from an ink ejection outlet of a head and ejection failure of ink droplets can be prevented within the range. The surface tension is more preferably from 15 to 50 mN/m.

[Inkjet Recording Apparatus]

In the invention, the aforementioned ink composition is recorded on a recording medium by the inkjet recording system. It is preferred in the invention that the inkjet recording system utilizing an electrostatic field is preferably employed. In the inkjet recording system utilizing an electrostatic field, a voltage is applied between a control electrode and a back electrode on the back surface of the recording medium, whereby the charged particles in the ink composition are concentrated at an ejection position through an electrostatic force to cause the ink composition to fly from the ejection position to the recording medium. In the case where the charged particles are positively charged, for example, the voltage is applied between the control electrode as an anode and the back electrode as a cathode. The same effect can be obtained by charging the recording medium instead of application of the voltage to the back electrode.

Examples of the method for flying an ink include a method of flying an ink from a point of a member having a needle shape, such as an injection needle, which can be used for recordation with the ink composition according to the invention. In the method, however, replenishment of the charged particles after concentration and ejection is difficult, and recordation cannot be stably attained for a long period of time. The charged particles are forcedly supplied in this method, and therefore, upon circulating the ink, the ink is overspilled from the point of the injection needle. Accordingly, the meniscus shape at the point of the injection needle as the ejection position is not stabilized to make stable recordation difficult. Therefore, the method is suitable for recordation of short-duration.

On the other hand, such a method is preferably used that the ink composition can be circulated without spillover of the ink composition from an ejection opening. In such a method, for example, an ink is circulated in an ink chamber having an ejection opening, and an ink guide is provided in the ejection opening. A voltage is applied to a control electrode formed around the ejection opening to cause concentrated ink droplets to fly from a point of the ink guide directed to a recording medium. In this method, both replenishment of the charged particles and stabilization of the meniscus at the ejection position can be simultaneously attained by circulating the ink composition, so as to enable stable recordation for a long period of time. Furthermore, the ink is in contact with the outside air only at a significantly small area, i.e., the ejection opening, and thus the solvent can be prevented from being evaporated to stabilize the physical property of the ink composition. Accordingly, the method is preferably used in the invention.

An example of a constitution of an inkjet recording apparatus suitable for application of the ink composition according to the invention will be described below.

An apparatus for printing in four colors on one surface of a recording medium shown in FIG. 1 will be described.

Figure 1:
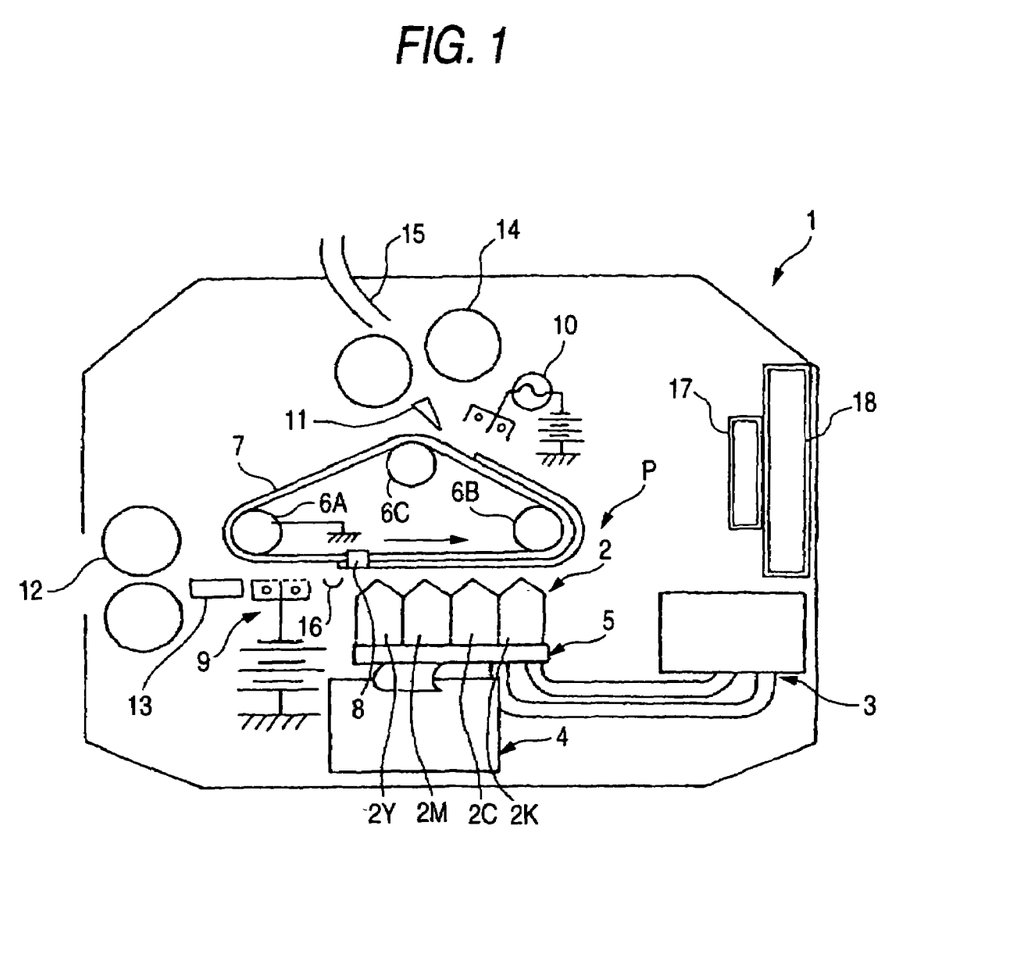
FIG. 1 is a schematic illustration showing an overall structure of an example of an inkjet recording apparatus used in the invention.

The inkjet recording apparatus 1 shown in FIG. 1 has an ejection head 2 for forming full color image formation constituted by unit ejection heads 2C, 2M, 2Y and 2K for four colors, an ink circulation system 3 for supplying an ink to the ejection head 2 and recovering the ink from the ejection head 2, a head driver 4 for driving the ejection head 2 based on output from an external device, such as a computer and RIP, which is not shown in the figure, and a position controlling means 5. The inkjet recording apparatus 1 also has a conveying belt 7 stretched among three rollers 6A, 6B and 6C, a conveying belt position detecting means 8 constituted by an optical sensor or the like for detecting the position in the width direction of the conveying belt 7, an electrostatic adsorption means 9 for retaining a recording medium P on the conveying belt 7, and a charge eraser 10 and a mechanical means 11 for releasing the recording medium P from the conveying belt 7 after completing image formation. A feeding roller 12 and a guide 13 for feeding the recording medium P from a paper stock, which is not shown in the figure, to the conveying belt 7 are disposed on the upstream side of the conveying belt 7, and a fixing means 14 and a guide 15 for fixing the ink on the recording medium P after releasing and conveying the recording medium P to a delivery tray, which is not shown in the figure, are disposed on the downstream side of the conveying belt 7. The inkjet recording apparatus 1 has thereinside a recording medium position detecting means 16 at a position opposite to the ejection head with respect to the conveying belt 7, and a solvent recovering part containing an exhaust fan 17 and a solvent vapor adsorbent 18 for recovering a solvent vapor generated from the ink composition, by which the solvent vapor inside the apparatus is exhausted to the exterior of the apparatus through the recovering part.

A known roller may be used as the feeding roller 12, which is disposed to obtain improved feeding capability of the recording medium. The recording medium P often has dusts and paper powder attached thereon, which are preferably removed. The recording medium P thus fed by the feeding roller 12 is conveyed to the conveying belt 7 through the guide 13. The back surface (preferably a metallic back surface) of the conveying belt 7 is disposed through the roller 6A. The recording medium thus conveyed is electrostatically adsorbed on the conveying belt with the electrostatic adsorption means 9. In the embodiment shown in FIG. 1, electrostatic adsorption is attained by a scorotron charging device connected to a negative high voltage electric source. The recording medium P is electrostatically adsorbed on the conveying belt 7 without floatage and is uniformly charged over the surface of the recording medium by the electrostatic adsorption means 9. While the electrostatic adsorption means is also used as a charging means of the recording medium in this embodiment, these means may be separately provided. The recording medium P thus charged is conveyed by the conveying belt 7 to the position of the ejection head 2, and recording signals are overlapped with the charged potential as bias to attain electrostatic inkjet image formation. The recording medium P thus having been subjected to image formation is destaticized by the charge eraser 10 and released from the conveying belt 7 by the mechanical means 11, followed by being conveyed to the fixing part. The recording medium P thus released is delivered to the image fixing means 14 for fixing. The recording medium P thus fixed is delivered to the delivery tray, which is not shown in the figure. The apparatus has a recovering means for recovering a solvent vapor generated from the ink composition. The recovering means has the solvent vapor adsorbent 18. The gas containing the solvent vapor inside the apparatus is introduced to the absorbent by the exhaust fan 17, and after adsorbing and recovering the solvent vapor, the gas is exhausted to the exterior of the apparatus. The apparatus is not limited to the aforementioned embodiment, but the constitutional components and the configurations, such as the numbers, shapes, relative positions and charging polarities of the constitutional devices including the roller and the charging device, can be arbitrarily selected. Furthermore, while the four-color printing is attained in the aforementioned system, multi-color systems exceeding four colors may be constituted by combining a light-color ink and a special color ink.

The inkjet recording apparatus used in the inkjet printing system has the ejection head 2 and the ink circulation system 3. The ink circulation system 3 has an ink tank, an ink circulation device, an ink concentration controlling device, an ink temperature controlling device and the like and the ink tank may contain thereinside a stirring device.

As the ejection head 2, a single channel head, a multi-channel head and a full-line head may be used, and main scanning is carried out by rotation of the conveying belt 7.

An inkjet head that can be preferably used in the invention is of such an inkjet system that the charged particles is electrophoresed in an ink flow channel to increase the ink concentration in the vicinity of the opening, so as to eject the ink, and ejects ink droplets mainly through an electrostatic attraction force caused by the recording medium or a counter electrode disposed in the back side of the recording medium.

Therefore, ink droplets are not ejected in the case where the recording medium or the counter electrode faces the head and the case where no voltage is applied to the recording medium or the counter electrode even though they face the head, whereby the interior of the apparatus is prevented from being contaminated.

Figure 2:
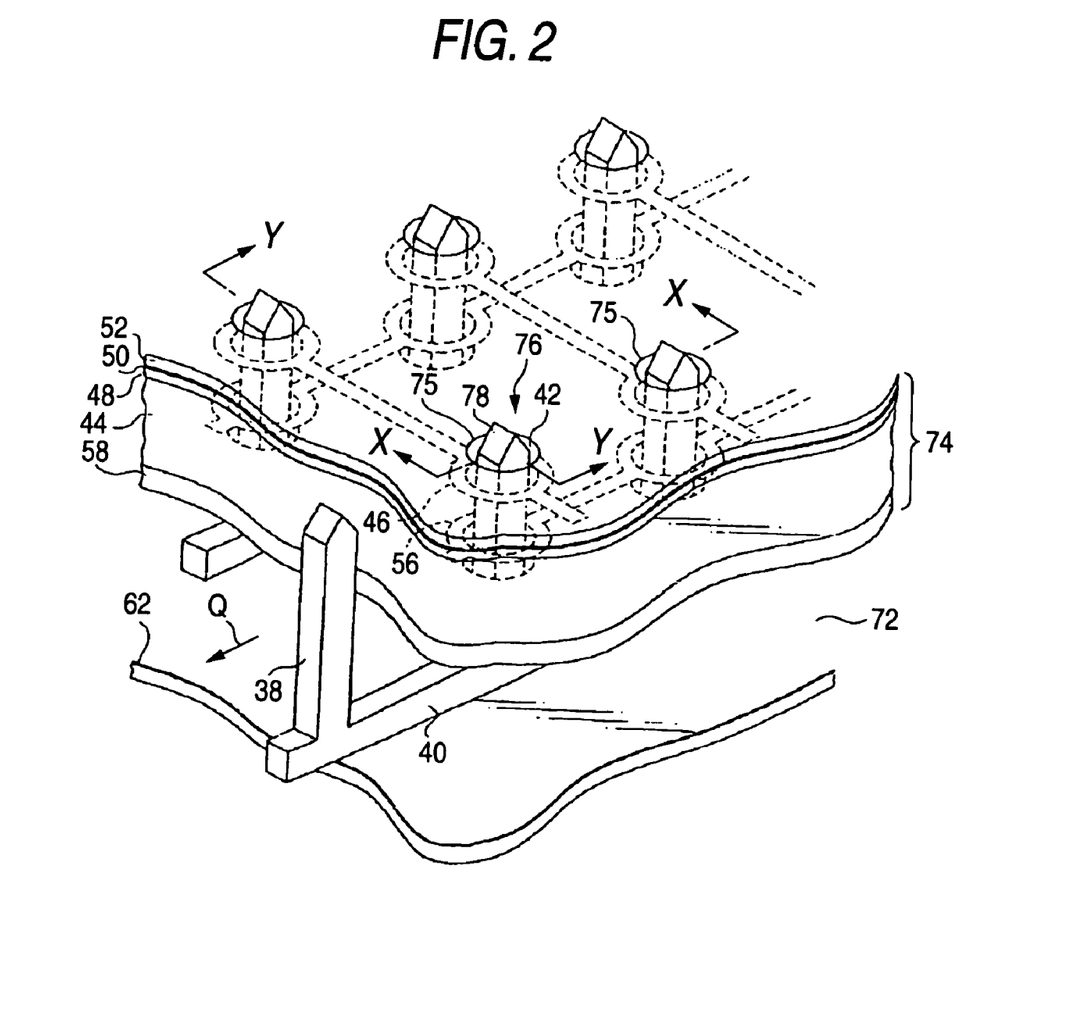
FIG. 2 is a perspective view showing a constitution of an inkjet head of the inkjet recording apparatus in the invention (The edge of the guard electrode surrounding each ejection part is not shown for an easy understanding.)
Figure 3:
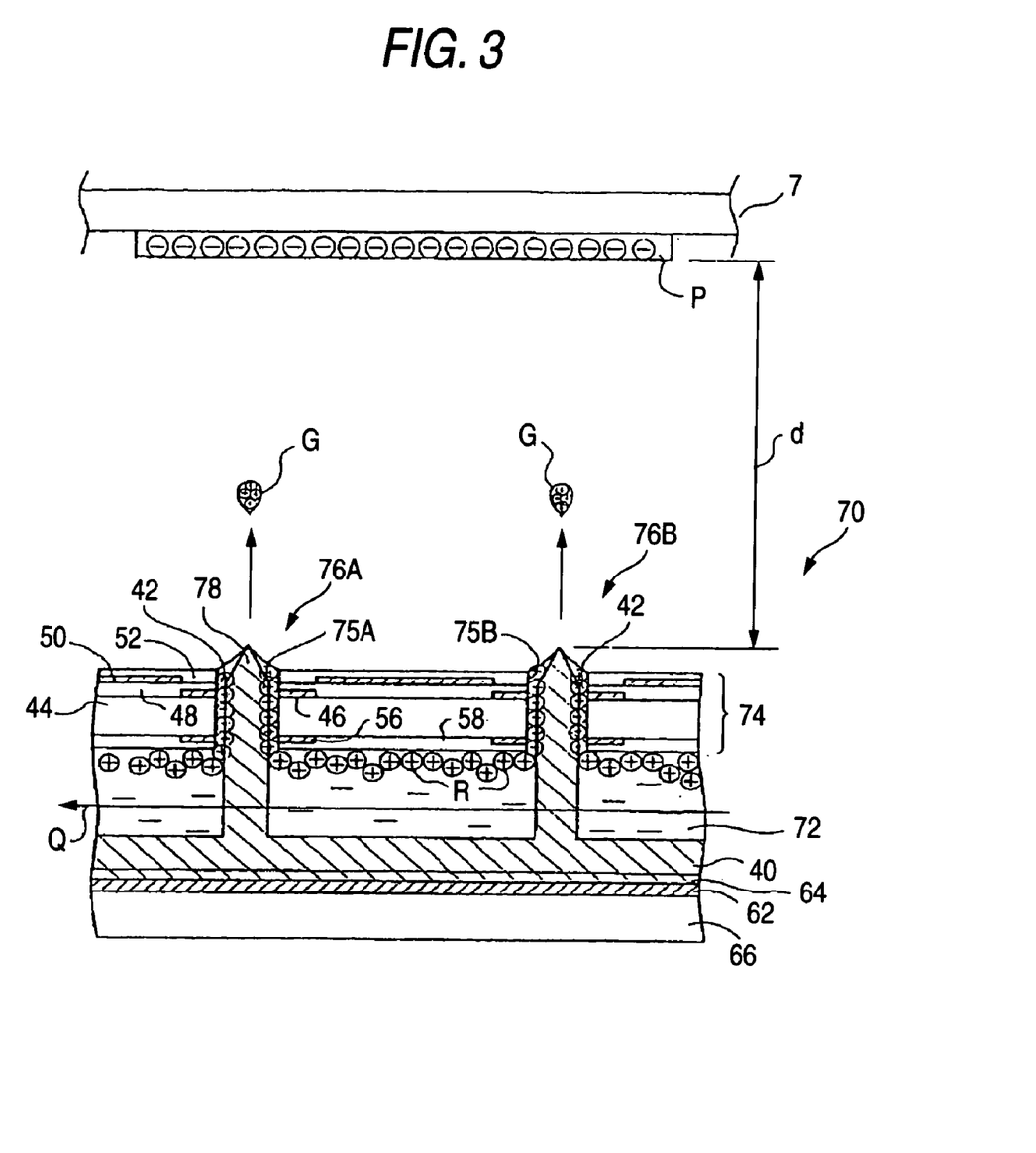
FIG. 3 is a side cross sectional view, showing a distribution state of charged particles where the number of ejection parts in the inkjet head shown in FIG. 2 is large. (Correspond to the section being taken in the direction of the arrows along the line X—X in FIG. 2)

FIGS. 2 and 3 show an ejection head that is preferably used in the aforementioned inkjet apparatus. As shown in FIGS. 2 and 3, an inkjet head 70 has an electroinsulative substrate 74 constituting an upper wall of an ink flow channel forming a unidirectional ink flow Q, and plural ejection parts 76 ejecting the ink to the recording medium P. The ejection part 76 is provided with an ink guide part 78 for guiding an ink droplet G flying from an ink flow channel 72 toward the recording medium P, and the substrate 74 has openings 75 through which the ink guide parts 78 penetrate, respectively. An ink meniscus 42 is formed between the ink guide part 78 and an inner wall of the opening 75. The gap d between the ink guide parts 78 and the recording medium P is preferably from 200 to 1,000 mm. The ink guide parts 78 are fixed at the lower ends thereof to a supporting bar 40.

The substrate 74 has an insulating layer 44 electrically insulating two ejection electrodes with a prescribed distance, a first ejection electrode 46 provided on the upper side of the insulating layer 44, an insulating layer 48 covering the first ejection electrode 46, a guard electrode 50 provided on the upper side of the insulating layer 48, and an insulating layer 52 covering the guard electrode 50. The substrate 74 also has a second ejection electrode 56 provided on the lower side of the insulating layer 44, and an insulating layer 58 covering the second ejection electrode 56. The guard electrode 50 is provided for preventing the adjacent ejection parts from being affected by a voltage applied to the first ejection electrode 46 and the second ejection electrode 56.

The inkjet head 70 also has a floating electroconductive plate 62 constituting a bottom surface of the ink flowing channel 72, and the floating electroconductive plate 62 electrophoreses the positively charged ink particles (charged particles) in the ink flowing channel 72 upward (i.e., toward the recording medium) with an induced voltage steadily generated by a pulsewise injection voltage applied to the first ejection electrode 46 and the second ejection electrode 56. The floating electroconductive plate 62 has formed on the surface thereof an electroinsulative coating film 64 for preventing the physical property and the composition of the ink from being destabilized due to charge injection into the ink. The electroinsulative film preferably has an electric resistance of $10^{12}$ Ω·cm or more, and more preferably $10^{13}$ Ω·cm or more. The electroinsulative film is preferably corrosion resistant to the ink, whereby the floating electroconductive plate 62 being corroded by the ink. The floating electroconductive plate 62 is covered from underneath with an insulating member 66. According to the constitution, the floating electroconductive plate 62 is in a completely electroinsulative state.

At least one of the floating electroconductive plate 62 is provided on each of the unit heads. (For example, in the case where four unit heads of C, M, Y and K are used, the unit heads each has at least one of the floating electroconductive plate, and the unit heads C and M, for example, do not have one floating electroconductive plate in common.)

In order to cause the ink to fly from the inkjet head 70 to record on the recording medium P, as shown in FIG. 3, a prescribed voltage (for example, +100 V) is applied to the guard electrode 50 in such a state that the ink is circulated in the ink flowing channel 72 to form an ink flow Q. Furthermore, a positive voltage is applied to the first ejection electrode 46, the second ejection electrode 56 and the recording medium P to form such a flying electric field, among the first ejection electrode 46, the second ejection electrode 56 and the recording medium P, that the positive charged particles R in the ink droplets G flying from the opening 75 as guided with the ink guide part 78 are attracted by the recording medium P. For example, in the case where the gap d is 500 mm, the voltage may be such an extent that forms a potential difference of about from 1 to 3.0 kV.

Under the aforementioned state, a pulsewise voltage is applied to the first ejection electrode 46 and the second ejection electrode 56 according to the image signal, and thus the ink droplets G with an increased charge particle concentration are ejected from the opening 75. For example, in the case where the initial charged particle concentration is from 3 to 15%, the charged particle concentration of the ink droplets G is 30% or more.

At this time, the voltage applied to the first ejection electrode 46 and the second ejection electrode 56 is adjusted in such a manner that the ink droplets G are ejection only upon applying the pulsewise voltage is applied to both the first ejection electrode 46 and the second ejection electrode 56.

Upon applying the pulsewise positive voltage, the ink droplets G fly from the opening 75 as guided by the ink guide part 78 to attach on the recording medium P, and at the same time, a positive induction voltage is generated in the floating electroconductive plate 62 by the positive voltage applied to the first ejection electrode 46 and the second ejection electrode 56. Even in the case where the voltage applied to the first ejection electrode 46 and the second ejection electrode 56 has a pulsewise form, the induction voltage is a substantially steady voltage. Therefore, the positively charged particles R in the ink flowing channel 72 receive a force of transferring them upward by the electric field formed among the floating electroconductive plate 62, the guard electrode 50 and the recording medium P, whereby the concentration of the charged particles R is increased in the vicinity of the substrate 74. In the case where the number of the ejection parts (i.e., channels for ejecting ink droplets) used is large as shown in FIG. 3, the number of charged particles required for ejection is also increased. In such a case, the numbers of the first ejection electrodes 46 and the second ejection electrodes 56 are also increased to generate a higher induction voltage in the floating electroconductive plate 62, whereby the number of the charged particles R moving toward the recording medium is thus increased.

While the case where the colored particles are positively charged has been described in this embodiment, the colored particles may be negatively charged. In the later case, the charging polarities are all inverted.

It is preferred in the invention that after ejecting the ink on the recording medium, the ink is fixed by an appropriate heating means. Examples of the heating means used include a contact heating device, such as a heating roller, a heating block and a heating belt, and a non-contact heating device, such as a dryer, an infrared ray lamp, a visible ray lamp, an ultraviolet ray lamp and a hot air oven. The heating device is preferably provided continuously to the inkjet recording apparatus and integrated thereto. The temperature of the recording medium upon fixing is preferably from 40 to 200° C. from the standpoint of easiness of fixation. The period of time for fixing is preferably from 1 msec to 20 seconds.

[Replenishment of Ink Composition]

In the inkjet recording system utilizing an electrostatic field, the charged particles in the ink composition is concentrated and ejected. Therefore, the amount of the charged particles in the ink composition is reduced after ejecting the ink composition for a long period of time to lower the electroconductivity of the ink composition. The ratio of the electroconductivity of the charged particles and the electroconductivity of the ink composition is also changed. Furthermore, there is such a tendency that the charged particles having larger diameters are ejected before the charged particles having smaller diameter, and thus the average particle diameter of the charged particles is decreased. Moreover, the content of the solid matters in the ink composition is changed to vary the viscosity thereof.

The changes in physical properties of the ink composition result in ejection failure, and decrease in optical density and blur in an image thus recorded. Accordingly, an ink composition having a higher concentration (a higher concentration of solid matters) than the ink composition initially charged in the ink tank is replenished to prevent the amount of the charged particles from being decreased, whereby the electroconductivity of the ink composition and the ratio of the electroconductivity of the charged particles and the electroconductivity of the ink composition can be maintained within certain ranges. The average particle diameter and the viscosity can also be maintained. Furthermore, the physical properties of the ink composition are maintained within certain ranges, whereby the ink composition can be ejected uniformly for a long period of time. The replenishment is preferably carried out by machines or by humans after the physical properties of the ink composition, such as the electroconductivity and the optical density, are detected to calculate the necessary replenishing amount. The replenishment may also be carried out by machines or by humans after the amount of the ink composition is calculated based on the image data.

[Recording Medium]

In the invention, various kinds of recording media may be used depending on purposes. For example, a printed matter can be directly obtained by inkjet recording on paper, a plastic film, a metal, paper having plastics or a metal laminated or deposited thereon, or a plastic film having a metal laminated or deposited thereon. An offset printing plate can be obtained by using a metallic support, such as aluminum, having a roughened surface. A flexographic printing plate and a color filter for a liquid crystal display can be obtained by using a plastic support. The recording medium may have a flat shape, such as a sheet form, or a stereoscopic shape, such as a cylindrical form. The invention can also be applied to production of a semiconductor and a printed circuit board by using a silicon wafer and a circuit board as the recording medium.

According to combinations of the ink composition, the inkjet recording apparatus and the replenishment of the ink composition, an image recorded product having a high image density and high image quality without blur of ink can be stably obtained for a long period of time.

EXAMPLES

The invention will be described in more detail with reference to the following examples, but the invention is not construed as being limited thereto. (Production of Crystalline Polymer)

[Crystalline Polymer 1]

70.8 parts by weight of sebacic acid (produced by Wako Pure Chemical Industries, Ltd.), 61 parts by weight of 1,10-decanediol (produced by Wako Pure Chemical Industries, Ltd.), 161 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 110 g of crystalline polyester.

The resulting polymer had a weight average molecular weight of 36,000 and a melting point (Tm) of 80° C.

[Crystalline Polymer 2]

44.15 parts by weight of adipic acid (produced by Wako Pure Chemical Industries, Ltd.), 41.36 parts by weight of 1,6-hexanediol (produced by Wako Pure Chemical Industries, Ltd.), 105 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 75 g of crystalline polyester.

The resulting polymer had a weight average molecular weight of 10,000 and a melting point (Tm) of 63 ° C.

[Crystalline Polymer 3]

70.8 parts by weight of sebacic acid (produced by Wako Pure Chemical Industries, Ltd.), 40.66 parts by weight of 1, 4-cyclohexanediol (produced by Wako Pure Chemical Industries, Ltd.), 137 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 100 g of crystalline polyester.

The resulting polymer had a weight average molecular weight of 19,000 and a melting point (Tm) of 75° C.

[Crystalline Polymer 4]

70.8 parts by weight of sebacic acid (produced by Wako Pure Chemical Industries, Ltd.), 31.54 parts by weight of 1,4-butanediol (produced by Wako Pure Chemical Industries, Ltd.), 126 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 94 g of crystalline polyester.

The resulting polymer had a weight average molecular weight of 22,000 and a melting point (Tm) of 70° C.

[Crystalline Polymer 5]

40 parts by weight of succinic anhydride (produced by Wako Pure Chemical Industries, Ltd.), 30 parts by weight of 1,3-propanediol (produced by Wako Pure Chemical Industries, Ltd.), 90 parts by weight of toluene (produced by Wako Pure Chemical Industries, Ltd.) and 0.76 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 60 g of crystalline polyester.

The resulting polymer had a weight average molecular weight of 10,000 and a melting point (Tm) of 77° C.

[Crystalline Polymer 6]

70.8 parts by weight of sebacic acid (produced by Wako Pure Chemical Industries, Ltd.), 50.47 parts by weight of 1,4-cyclohexanedimethanol (produced by Wako Pure Chemical Industries, Ltd.), 149 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 120 g of crystalline polyester.

The resulting polymer had a weight average molecular weight of 44,000 and a melting point (Tm) of 55° C.

[Crystalline Polymer 7]

60.7 parts by weight of sebacic acid (produced by Wako Pure Chemical Industries, Ltd.), 18.02 parts by weight of 1,4-butanediol (produced by Wako Pure Chemical Industries, Ltd.), 6.37 parts by weight of 2-hydroxy-1,4-butanediol, 126 parts by weight of xylene (produced by Wako Pure Chemical Industries, Ltd.) and 0.67part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 78 g of crystalline polyester.

The resulting polymer had a weight average molecular weight of 28,000 and a melting point (Tm) of 62 ° C.

[Crystalline Polymer 8]

44.15 parts by weight of adipic acid (produced by Wako Pure Chemical Industries, Ltd.), 27.23 parts by weight of p-xylylene glycol (produced by Tokyo Kasei Kogyo Co., Ltd.), 105 parts by weight of xylene (produced by Wako Pure Chemical Industries, Ltd.) and 0.67 part by weight of p-toluenesulfonic acid monohydrate (produced by Wako Pure Chemical Industries, Ltd.) were placed in a three-neck flask and refluxed over an oil bath to react them by the azeotropic dehydration method for 8 hours. Thereafter, the reaction mixture was cooled to room temperature. The reaction mixture was then placed in 3 L of methanol to purify by reprecipitation, followed by drying in vacuum, to obtain about 62 g of crystalline polyester.

The resulting polymer had a weight average molecular weight of 14,000 and a melting point (Tm) of 75° C.

Example 1

<Materials Used>

The following materials were used in Example 1. Cyan pigment (colorant) : phthalocyanine pigment, C.I. Pigment Blue (15:3) (Lionol Blue FG-7350, produced by Toyo Ink Mfg. Co., Ltd.)
Coating material: AP-1
Crystalline polymer 1
Dispersing agent: BZ-2
Charge controlling agent: CT-1
Dispersion medium: Isopar G (produced by Exxon Chemical Corp.)

The chemical structures of the coating material AP-1, the dispersing agent BZ-2 and the charge controlling agent CT-1 are shown below.

The coating material AP-1 was obtained in the following manner. Styrene, 4-methylstyrene, butyl acrylate, dodecyl methacrylate and 2-(N,N-dimethylamino)ethyl methacrylate were subjected to radical polymerization with a known polymerization initiator, and the resulting polymer was then reacted with methyl tosylate. The coating material AP-1 had a weight average molecular weight of 15,000, a polydispersion degree (weight average molecular weight/number average molecular weight) of 2.7, a glass transition point (midpoint) of 51° C., and a softening point measured by a strain gauge of 46° C.

The dispersing agent BZ-2 was obtained in the following manner. Stearyl methacrylate was polymerized in the presence of 2-mercaptoethanol, and the resulting polymer was then reacted with methacryl anhydride to obtain a stearyl methacrylate polymer having methacryloyl groups at ends thereof (having a weight average molecular weight of 7,600). The polymer was subjected to radical polymerization with styrene to obtain the dispersing agent BZ-2, which had a weight average molecular weight of 110,000.

The charge controlling agent CT-1 was obtained by reacting a copolymer of 1-octadecene and maleic anhydride with 1-hexadecylamine. The charge controlling agent CT-1 had a weight average molecular weight of 17,000.

<Production of Ink Composition EC-1>

10 g of the cyan pigment, 16 g of the coating material AP-1 and 4 g of the crystalline polymer 1 were placed in a desktop kneader, PBV-0.1, produced by Irie Shokai Co., Ltd., and mixed under heating at a heater temperature set at 100° C. for 2 hours. 30 g of the mixture thus obtained was coarsely pulverized in a trio blender, produced by Trio Science Co., Ltd., and then finely pulverized in a sample mill, Model SK-M10, produced by Kyoritu Riko Co., Ltd. 30 g of the finely pulverized product thus obtained was preliminary dispersed in a paint shaker, produced by Toyo Seiki Co., Ltd., along with 7.5 g of the dispersing agent BZ-2, 75 g of Isopar G and glass beads having a diameter of about 3.0 mm. After removing the glass beads, the mixture was further dispersed (formed into particles) along with zirconia ceramic beads having a diameter of about 0.6 mm in a Dinor mill, Type KDL, produced by Shinmaru Enterprises Co., Ltd., for 5 hours at an inner temperature maintained at 25° C. and for further 5 hours at 45° C., at a rotation number of 2,000 rpm. The zirconia ceramic beads were removed from the resulting dispersion liquid, to which 316 g of Isopar G and 0.6 g of the charge controlling agent CT-1 were added, to obtain an ink composition EC-1.

<Inkjet Recording>

The ink composition EC-1 of Example 1 was charged in an ink tank of an inkjet recording apparatus having the structure shown in FIGS. 1 to 3. The ejection head used was a 833 channel head of 150 dpi (three rows having a channel density of 50 dpi staggeredly arranged) having the structure shown in FIG. 2, and the fixing means was a heat roller formed with silicone rubber having a 1 kW heater contained therein. An immersion heater and stirring blades were provided as the ink temperature controlling means inside the ink tank, and the ink temperature was set at 30° C., which was controlled with a thermostat by rotating the stirring blades at 30 rpm. The stirring blades were also used as a stirring means for preventing precipitation and aggregation. Apart of the ink flowing channel was made transparent, between which an LED light emission device and a photodetector device were provided, and the concentration of the ink composition was controlled based on the output signals therefrom by adding an ink diluting fluid (Isopar G) or a concentrated ink composition (which had twice the concentration of the ink composition initially charged). Fine coated paper for offset printing was used as the recording medium. After removing dusts on the surface of the recording medium by suction with an air pump, the ejection head was moved to the image forming position closely to the recording medium. Image data to be recorded was sent to the image data operating and controlling part, and the ink composition was successively ejected by driving the ejection head while the recording medium was conveyed through rotation of the conveying belt, so as to form an image with a drawing resolution of 2,400 dpi. The conveying belt used was a belt obtained by laminating a metallic belt and a polyimide film, and a linear marker was provided in the conveying direction near one end of the belt. The marker was optically read by a conveying belt position detecting means, and the position controlling means was driven accordingly to attain image formation. The distance between the ejection head and the recording medium detected by an optical gap detecting device was maintained at 0.5 mm. The surface potential of the recording medium upon ejection was set at −1.5 kV, and a pulse voltage of +500 V (with a pulse width of 50 msec) was applied upon ejection to attain image formation with a driving frequency of 15 kHz.

The resulting gray scale image recorded product (printed matter) had an extremely sharp image without stripe unevenness or ink blur. Image formation failure was completely not observed, and image deterioration due to change in dot diameter or the like was not observed even upon change in outer temperature and increase in recording duration, so as to enable image formation in good conditions.

<Evaluation of Fixation>

The image thus formed was immediately fixed by using a heating roller with the temperature of the coated paper upon fixing being varied from 60 to 100° C. by 5° C., and the temperature where the coating material flowed (flow starting temperature) and the maximum temperature where offset to the heating roller did not occur (maximum offset resistant temperature) were used as standards for evaluation of fixation.

That is, such an ink composition is desired that the flow starting temperature is attained at a lower temperature, and offset does not occur until a higher temperature. The term "flowing" referred herein means such a state that the coating material is melted and formed into a film after flowing.

The results obtained are shown in Table 1. The flow starting temperature was evaluated by observing an SEM micrograph of an image surface after fixing.

The maximum offset resistant temperature was evaluated by offset occurring on the heating roller, which was evaluated by visually observing an image offset on the heating roller after transferring the offset image to paper.

The blocking property of the printed image was evaluated in such a manner that an image was formed on printing paper at a fixing temperature satisfying fixing property, on which the same paper as the printing paper was superimposed and applied with a load of about 50 g/cm$^2$ at 50° C. for 24 hours, and the extent of transfer of the image part to the superimposed paper was visually observed.

The flow starting temperature and the maximum offset resistant temperature were also measured in the same manner as in the foregoing under such a state that the solvent remained on the recording medium (coated paper) to evaluate the fixing property.

Example 2

An ink composition EC-2 was produced by using the same materials in the same manner as in Example 1 except that the coating material AP-1 was changed to polyester, Vylon 220, produced by Toyobo, Co., Ltd. The ink composition EC-2 was subjected to the inkjet image formation, the evaluation of fixing property and the evaluation of antiblocking property in the same manner as in Example 1. The results obtained are shown in Table 1.

Example 3

An ink composition EC-3 was produced by using the same materials in the same manner as in Example 1 except that the coating material AP-1 was changed to a crystalline polymer 3. The ink composition EC-3 was subjected to the inkjet image formation, the evaluation of fixing property and the evaluation of antiblocking property in the same manner as in Example 1. The results obtained are shown in Table 1.

Comparative Example 1

An ink composition RC-1 was produced by using the same materials in the same manner as in the production for the ink composition EC-1 of Example 1 except that the crystalline polymer 1 was not added. The ink composition RC-1 was subjected to the inkjet image formation, the evaluation of fixing property and the evaluation of antiblocking property in the same manner as in Example 1. The results obtained are shown in Table 1.

Comparative Example 2

An ink composition RC-2 was produced by using the same materials in the same manner as in the production for the ink composition EC-1 of Example 1 except that the coating material AP-1 was changed to polymethyl methacrylate (Mw: 50,000, Tg: 10° C.), and the crystalline polymer 1 was not added. The ink composition RC-2 was subjected to the inkjet image formation, the evaluation of fixing property and the evaluation of antiblocking property in the same manner as in Example 1. The results obtained are shown in Table 1.

TABLE 1

| | Melting point of crystalline polymer (Tm, ° C.) | Fixing property | Antiblocking property | Fixing property (solvent remaining on printing paper) |
|---|---|---|---|---|
| Example 1 | 80 | A | A | A |
| Example 2 | 80 | A | A | A |
| Example 3 | 75 | A | A | A |
| Comparative Example 1 | — | C | A | B |
| Comparative Example 2 | — | C | C | C |

In Table 1, the melting point (Tm) of the crystalline polymer was a value calculated from an endothermic peak measured by a DSC.

The evaluation standard of the fixing property was as follows.

(Fixing Property)

A: The flow starting temperature was 70° C. or lower, and the maximum offset resistant temperature was 80° C. or higher.

B: The flow starting temperature was 75° C. or higher and was less than 80° C., and the maximum offset resistant temperature was 80° C. or higher.

C: the flow starting temperature was 80° C. or higher, or the maximum offset resistant temperature was less than 80° C.

The evaluation standard of the antiblocking property was as follows.

(Antiblocking Property)

A: No transferred matter was observed.

B: A certain amount of transferred matters was observed.

C: A significant amount of transferred matters was observed.

It was understood from Examples 1 to 3 that the addition of the crystalline polymer having a melting point (Tm) lowered the fixable temperature and simultaneously satisfied the antiblocking property. Furthermore, even in the case where the recording paper contained the solvent remaining, i.e., the coating material was liable to flow, the state where offset hardly occurred was maintained to satisfy the fixing property.

In Comparative Example 1, on the other hand, the fixable temperature was difficult to be lowered only with the coating material ordinarily used, and in the case where the recording paper contained the solvent remaining, i.e., the coating material was liable to flow, offset was liable to occur to fail to satisfy the fixing property. In Comparative Example 2, the fixable temperature could be lowered by lowering the Tg of the coating material ordinarily used, but simultaneously, the antiblocking property and the offset resistance were deteriorated to fail to satisfy the target fixing property.

Examples 4 to 22

Ink compositions EC-4 to EC-22 were produced in the same manner as in the production for the ink composition EC-1 of Example 1 except that the kind and the addition amount of the crystalline polymer and the addition amount of the coating material AP-1 were changed to those shown in Tables 2 and 3 below.

TABLE 2

| | Ink composition | Crystalline polymer (Tm, ° C.) | Addition amount of crystalline polymer (g) | Addition amount of coating material AP-1 (g) |
|---|---|---|---|---|
| Example 4 | EC-4 | crystalline polymer 1 (80) | 6 | 14 |
| Example 5 | EC-5 | crystalline polymer 1 (80) | 8 | 12 |
| Example 6 | EC-6 | crystalline polymer 2 (63) | 4 | 16 |

TABLE 2-continued

|  | Ink composition | Crystalline polymer (Tm, ° C.) | Addition amount of crystalline polymer (g) | Addition amount of coating material AP-1 (g) |
|---|---|---|---|---|
| Example 7 | EC-7 | crystalline polymer 2 (63) | 6 | 14 |
| Example 8 | EC-8 | crystalline polymer 3 (75) | 4 | 16 |
| Example 9 | EC-9 | crystalline polymer 4 (70) | 4 | 16 |
| Example 10 | EC-10 | crystalline polymer 5 (77) | 4 | 16 |
| Example 11 | EC-11 | crystalline polymer 6 (55) | 4 | 16 |
| Example 12 | EC-12 | crystalline polymer 7 (62) | 4 | 16 |
| Example 13 | EC-13 | crystalline polymer 8 (75) | 4 | 16 |
| Example 14 | EC-14 | polyethylene glycol* (Mw: 8,000) (63) | 4 | 16 |
| Example 15 | EC-15 | polyethylene glycol methyl ether* (Mw: 5,000) (60) | 4 | 16 |

Note:
*produced by Wako Pure Chemical Industries, Ltd.

TABLE 3

|  | Ink composition | Crystalline polymer (Tm, ° C.) | Addition amount of crystalline polymer (g) | Addition amount of coating material AP-1 (g) |
|---|---|---|---|---|
| Example 16 | EC-16 | polyethylene oxide* (Mw: 100,000) (65) | 6 | 14 |
| Example 17 | EC-17 | polyethylene/1-butene copolymer** (Mw: 110,000) (65) | 8 | 12 |
| Example 18 | EC-18 | polyethylene/1-butene/CO copolymer** (Mw: 70,000) (63) | 6 | 14 |
| Example 19 | EC-19 | crystalline polymer 1 (80)/ crystalline polymer 2 (63) = 50/50 (% by weight) | 4 | 16 |
| Example 20 | EC-20 | crystalline polymer 1 (80)/ crystalline polymer 5 (77) = 50/50 (% by weight) | 4 | 16 |
| Example 21 | EC-21 | crystalline polymer 1 (80)/ crystalline polymer 7 (62) = 50/50 (% by weight) | 4 | 16 |
| Example 22 | EC-22 | crystalline polymer 1 (80)/ polyethylene oxide* (Mw: 100,000) (65) = 50/50 (% by weight) | 6 | 14 |

Note:
*produced by Wako Pure Chemical Industries, Ltd.
**produced by Sigma-Aldrich Co.

The resulting ink compositions EC-4 to EC-22 were evaluated in the same manner as in Example 1. It was understood, as a result, that the addition of the crystalline polymer having a melting point (Tm) lowered the fixable temperature and simultaneously satisfied the antiblocking property.

According to the invention, such an ink composition and an inkjet recording method are provided that are capable of fixing an image with high quality to a recording medium at a low temperature with high speed.

In particular, the polymer having a melting point (Tm) is melted sharply with respect to temperature (sharp melt property) to attain sharp melt property with anti-blocking property maintained, whereby an image can be fixed at a low temperature with high speed to provide an image with high quality.

The entire disclosure of each and every foreign patent application from which the benefit of foreign priority has been claimed in the present application is incorporated herein by reference, as if fully set forth.

What is claimed is:

1. An ink composition for electrostatic inkjet recording, comprising:
    a dispersion medium; and
    a charged particle comprising a colorant,
    wherein the charged particle contains at least one polymer, and said at least one polymer includes at least one first polymer having a melting point of from 40 to 100° C.

2. The ink composition for electrostatic inkjet recording of claim 1,
    wherein said at least one polymer includes said at least one first polymer in amount of from 5 to 100% by weight.

3. The ink composition for electrostatic inkjet recording of claim 1, wherein said at least one first polymer comprises a crystalline polyester compound.

4. The ink composition for electrostatic inkjet recording of claim 1,
wherein said at least one first polymer comprises a crystalline polyethylene compound.

5. The ink composition for electrostatic inkjet recording of claim 1,
wherein said at least one first polymer comprises a crystalline polyethylene glycol compound.

6. The ink composition for electrostatic inkjet recording of claim 1,
wherein the charged particle further contains a coating material that coats the colorant, the coating material comprising at least one of (i) said at least one first polymer and (ii) at least one second polymer not having a melting point.

7. The ink composition for electrostatic inkjet recording of claim 6,
which has the coating material in amount of 0.1 to 40% by weight.

8. An method of inkjet recording comprising:
flying an ink droplet of an ink composition by utilizing an electrostatic field,
wherein the ink composition comprises:
a dispersion medium; and
a charged particle comprising a colorant,
wherein the charged particle contains at least one polymer, and said at least one polymer includes at least one first polymer having a melting point of from 40 to 100° C.

* * * * *